United States Patent [19]
Draber et al.

[11] 3,897,438
[45] July 29, 1975

[54] PROCESS FOR THE PRODUCTION OF N-(1,1,1-TRISUBSTITUTED)-METHYLAZOLES

[75] Inventors: Wilfried Draber; Erik Regel, both of Wuppertal-Elberfeld, Germany

[73] Assignee: Farbenfabriken Bayer AG, Germany

[22] Filed: Feb. 19, 1971

[21] Appl. No.: 117,161

[30] Foreign Application Priority Data
Feb. 26, 1970  Germany............................ 2009020

[52] U.S. Cl...... 260/296 R; 260/308 D; 260/308 R; 260/328; 260/335; 260/309; 260/294.8 G; 260/307 H; 260/347.7; 260/329 AM; 260/302 H; 260/302 D; 260/308 A; 260/310 R; 260/313.1; 260/389; 260/386; 260/390; 71/88; 71/90; 71/92; 71/94; 71/95; 424/273; 424/263; 424/275; 424/269; 424/270; 424/272; 260/309.2
[51] Int. Cl....C07d 31/00; C07d 49/36; C07d 55/02
[58] Field of Search........ 260/296 R, 308 R, 308 D, 260/386, 389, 390

[56] References Cited
FOREIGN PATENTS OR APPLICATIONS
1,170,188  11/1969  United Kingdom................. 260/309

Primary Examiner—Henry R. Jiles
Assistant Examiner—Robert T. Bond

[57] ABSTRACT

N-(1,1,1-trisubstituted)-methylazoles are produced by reacting thionyl-imidazole with a substituted carbinol of the formula:

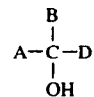

wherein A is aliphatic, cycloaliphatic, aromatic or heteroaromatic, B is aliphatic, cycloaliphatic, aromatic or a 5- or 6-membered heteroaromatic ring having 1 to 3 N-heteroatoms or 1 or 2 N-heteroatoms plus an oxygen or sulphur heteroatom and D is aliphatic, cycloaliphatic, aromatic, alkoxycarbonyl, alkoxycarbonylalkyl, aryloxycarbonyl or a 5- or 6-membered heteroaromatic ring having 1 to 3 N-heteroatoms or 1 or 2 N-heteroatoms plus an oxygen or sulphur heteroatom and related carbinols. The reactants are in 1:1 molar ratio and the reaction is carried out in dry inert solvents at a temperature of −20° C. to +150° C.

53 Claims, No Drawings

PROCESS FOR THE PRODUCTION OF N-(1,1,1-TRISUBSTITUTED)-METHYLAZOLES

The present invention relates to a process for the preparation of known and novel N-(1,1,1-trisubstituted)-methylazoles useful as fungicides, herbicides and plant growth control agents.

Compounds of this invention and their salts have good antimycotic activities against human-pathogenic fungi and yeasts (see Belgian Pat. Nos. 736,314, 720,801, 741,310, 742,389, 746,301, 746,983 and 750,724) as well as fungicidal activities against phytopathogenic fungi (see Belgian Pat. Nos. 721,378, 727,488, 727,489, 738,095 and U.S. Pat. No. 3,321,366). Furthermore, some of these compounds exhibit herbicidal activities or plant growth controlling properties (see Belgian Pat. No. 753,150).

H. Giesemann and G. Halschke [Chem. Ber. 92, 92–98 (1959)] disclose that N-tritylimidazoles can be obtained by reacting the silver salts of imidazoles with triphenyl-chloromethane in boiling benzene, or, according to U.S. Pat. No. 3,321,336, by reacting sodium or silver salts of imidazoles with triaryl-methyl chlorides or bromides in suitable organic solvents at 20°–100° C. Moreover, N-tritylimidazoles can be prepared according to the above Belgian Pat. No. 720,801 by reacting triphenylmethyl halides with silver or sodium salts of imidazoles, or by reacting imidazoles with triphenylmethyl carbinols.

However, these known processes have a number of disadvantages. The silver salts of imidazoles must be separately prepared and are expensive starting materials. Moreover, Giesemann and Halschke supra state that the N-tritylimidazoles, which can be prepared by the reaction they describe, are only obtained in yields of between 11.5% and 49.7% of the theoretical yield.

The present invention provides a process for preparing N-(1,1,1-trisubstituted)-methylazoles of the formula (I):

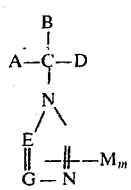

(I)

in which
A is a substituted or unsubstituted aliphatic, cycloaliphatic, aromatic or heteroaromatic radical and
B is a substituted or unsubstituted aliphatic, cycloaliphatic or aromatic radical, or a five- or six-membered heteroaromatic ring of the formula (II):

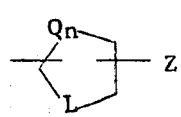

wherein
L is oxygen, sulphur, >N-alkyl, >N-aryl or CH;
Q is nitrogen or CH;
Z is hydrogen, alkyl, halogen or substituted or unsubstituted aryl and
$n$ is 1 or 2;

and in which the radicals A and B together with the central carbon atom may be linked to form an aliphatic ring having 3–7 carbon atoms; and in the case where A is aliphatic and B is aromatic, A and B may also be linked to one another, and A and B together with the central carbon atom may be linked to form a ring system which may be substituted in the aromatic rings and corresponds to the formula:

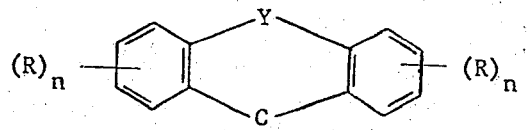

where
Y is a direct bond, sulphur or oxygen or alkylene which may contain a double bond;
R is a substituent or hydrogen; and
$n$ is 1 or 2; the substituents $R_n$ may be the same or different in the rings; and in which
D is a substituted or unsubstituted aliphatic, cycloaliphatic or aromatic radical or alkoxycarbonyl, alkoxy-carbonyl-alkyl, aryloxycarbonyl or a five- or six-membered heteroaromatic ring of the formula (II):

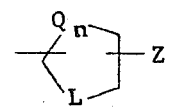

where Q, L, Z and $n$ have the same meaning as above, and in which

E is nitrogen or a group —CH or —C—R$^1$;

G is nitrogen or a group —CH or —C—R$^2$ where R$^1$ and R$^2$ together with the carbon atoms of E and G form a fused benzene ring;
M is hydrogen, alkyl, aryl, alkoxy-carbonyl, aryloxycarbonyl; and
$m$ is 1, 2 or 3,
which comprises reacting a thionyl-azolide of the formula (III):

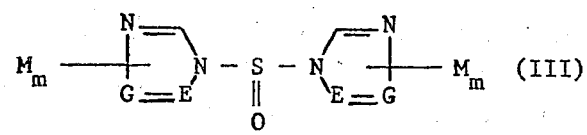

(III)

in which
E, G, M and $m$ have the same meaning as above, with a carbinol of the formula (IV):

in which
A, B and D have the same meaning as above, in dry organic solvents that are inert to the reaction, at temperatures from about −20° C. to about +150° C.

The radicals A, B and D when aromatic may carry one or more identical or different substituents, preferably one or two, more particularly one. They preferably contain 6 to 10 carbon atoms; aromatic radicals which are particularly preferred are the phenyl and naphthyl radicals. The substituents in these aromatic radicals A, B and D may be straight-chain or branched alkyl groups having 1–8, preferably 1–4 carbon atoms, which in appropriate instances may contain a double or triple bond; i.e., straight or branched chain alkenyl or alkynyl of up to 8 carbon atoms, preferably up to 6 carbon atoms; alkoxy groups and alkylmercapto groups having 1–8 carbon atoms, preferably 1–4 carbon atoms, methoxy, ethoxy and methylmercapto being specific examples. Other suitable substituents in the aromatic radicals A, B and D are phenoxy, alkylsulphonyl having 1–4, preferably 1 carbon atom in the alkyl part; the amino group; the mono- and dialkylamino groups where the alkyl groups contain 1–4, preferably 1 carbon atom; the carboxyl group; the carbalkoxy group containing 1–4, preferably 1 carbon atom in the alkyl part; electronegative substituents, for example nitro, cyano, trifluoromethyl and the halogens, preferably fluorine, chlorine and bromine; and hydroxyl.

The heteroaromatic radical A is preferably a 6-membered heterocycle containing 1 to 3 nitrogen atoms; the main example being the pyridyl radical. The heteroaromatic radical A may carry the same substitutents as the aromatic radicals A, B and D, but it is preferably unsubstituted.

Aliphatic radicals A, B and D are straight-chain or branched alkyl groups which contain 1 to 8, preferably 1 to 5 carbon atoms and may in appropriate instances contain a double or triple bond, i.e., straight or branched chain alkenyl or alkynyl of up to 8 carbon atoms, preferably up to 6 carbon atoms. The radicals A, B and D when aliphatic are preferably unsubstituted but may contain the same substituents as the aromatic radicals A, B and D.

Radicals A, B and D when cycloaliphatic preferably contain 3 to 10 carbon atoms. They are mono-, bi and tricyclic ring systems which may carry the same substituents as the aromatic radicals A, B and D and in addition, if the size of the ring allows, may also contain one or two double bonds. Saturated, unsubstituted, cycloaliphatic radicals are preferred: the cyclopropyl, cyclopentyl, cyclohexyl, bicyclo-[2,2,1]-heptyl and adamantyl radicals are of special importance.

Heteroaromatic rings B and D are preferably the pyridyl radical and rings of the formula:

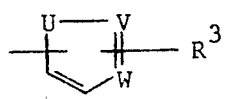

in which

U is oxygen or sulphur, NH or N-alkyl with 1–4, preferably 1 carbon atom in the alkyl part;
V and W are identical or different and are each nitrogen or CH; and
$R^{33}$ is hydrogen or alkyl with 1–4 carbon atoms, preferably with 1 carbon atom.

The thienyl, isoxazolyl, imidazolyl and furyl radicals which may be substituted by methyl groups are particular examples. The preferred six-membered heteroaromatic ring is the pyridyl ring.

L in formula (II) is the >N-alkyl group having 1–4, preferably 1 carbon atom, or the >N-aryl group, where aryl is preferably phenyl.

When Z is alkyl it is a straight-chain or branched lower alkyl of 1–4, preferably 1 carbon atom.

When Z is halogen it is preferably fluorine, chlorine or bromine, primarily chlorine or bromine.

When Z is substituted or unsubstituted aryl it is preferably phenyl, which may contain the same substituents as the aromatic radicals A, B and D.

The radicals A and B together with the central carbon atom may form a 3- to 7-, preferably 5- or 6-membered ring, which may contain a double bond.

When A is aliphatic and B is aromatic, A together with two carbon atoms of B may form a 5- or 6-membered ring.

When Y is alkylene it contains 1 to 3, preferably 2 carbon atoms, and may contain a double bond. The substituents R may be those mentioned as substituents of the aromatic radicals A, B and D.

When D is alkoxy-carbonyl it contains 1–4, preferably 1 or 2 carbon atoms in the alkyl part, and when D is alkoxycarbonyl-alkyl it contains 1–4, preferably 1 or 2 carbon atoms in the alkyl parts. When D is aryloxycarbonyl it contains 6 to 10, preferably 6 carbon atoms in the aryl part.

When M is alkyl it contains 1–4, preferably 1 carbon atom; when M is aryl it is phenyl or naphthyl, preferably the phenyl group. When M is alkoxycarbonyl it contains 1–4, preferably 1 or 2 carbon atoms in the alkyl part and when it is aryloxycarbonyl it contains 6 to 10, preferably 6 carbon atoms in the aryl part.

m is 1, 2 or 3, preferably 1 or 2.

The thionyl-azolides required as starting material are prepared in known manner by reacting the heterocycles with thionyl chloride and with a base for intercepting the hydrogen chloride formed [H.A. Staab, K. Wendel, Ang. Chem. 73, 26 (1961); H. A. Staab, Ang. Chem. 74, 407 (1962)].

For example, thionyl-imidazole

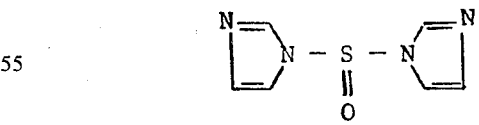

is obtained by introducing 1 mol equivalent of thionyl chloride into a solution or suspension of 4 mol equivalents of imidazole in acetonitrile. It is expedient to use a solvent in which the hydrochloride of the base used for intercepting the liberated hydrogen chloride is insoluble or sparingly soluble, for example tetrahydrofuran or acetonitrile.

Thionyl-1,2,4-triazole and the other thionyl-azolides are obtained in an analogous way.

The thionyl-azolides of the formula (III) are highly sensitive to moisture; it is therefore expedient to react them, after separation of the base hydrochloride, without isolation, in solution with a carbinol of the formula (IV).

The carbinols (IV) used as starting material are known and can be obtained in known manner, for example, from ketones and metal-organic compounds by a Grignard reaction, or from ketones and α-halo-fatty acid esters by a Reformatzki reaction, or also from ketones and pyridine-carboxylic acids by a Hammick reaction.

As diluents, there are used organic solvents which have been well dried and are inert to the reaction of the invention. Suitable solvents are, for example, aliphatic or aromatic hydrocarbons with a boiling range from about 60° to 120° C., for example, petroleum ether, benzene or toluene; also nitriles such as acetonitrile; lower aliphatic ketones such as acetone; and dialkyl ethers such as diethyl ether. Other examples are nitromethane, dimethylformamide and tetrahydrofuran. Acetonitrile is the particularly preferred solvent.

The reaction temperatures may vary within a fairly wide range from about −20° C. to about 150° C. It is advantageous to work within the range from about 0° C. to about 80° C., especially from about 0° to about 50° C.

In carrying out the process according to the invention, the starting materials are preferably used in a molar ratio of 1:1. The sequence in which the reaction components are brought together is of no importance for the feasibility of the reaction. The reaction times lie within the range from about 3 to about 25 hours. Depending on the selected solvent, the reaction product is precipitated when the reaction is completed and can be filtered off with suction or it can be isolated by the usual methods.

When o-chlorotrityl-carbinol and thionyl-bisimidazole are used as starting materials, for example, the course of the reaction can be illustrated by the following equation:

It is known [H. A. Staab and K. Wendel, Ann. 694, 86 (1966)] that the reaction of thionyl-imidazole with organic hydroxy compounds such as menthol (2-isopropyl-5-methylcyclohexanol) or α-naphthol, for example, at 20° C. in tetrahydrofuran leads to good yields of sulphurous acid diesters of the hydroxy compounds concerned. It must therefore be regarded as definitely surprising that the trisubstituted carbinols of the formula (IV):

react with thionylazolides of the formula (III) to give the N-(1,1,1-trisubstituted)-methylazoles of the formula (I).

The process according to the invention is also specially indicated in the case where the carbinols (IV) or their chlorides of the formula (V):

in which A, B and D have the same meaning as above, react with azoles according to known methods to form olefines where the chlorides (V) can be obtained only with difficulty; and where the carbinol (IV) cannot be converted under the conditions of known processes into the corresponding chloride or the corresponding azole (I).

Furthermore, the N-(1,1,1-trisubstituted)-methylazoles are obtained in substantially higher yields according to the process of the invention than according to the known processes. The process according to the invention has the additional advantage that, due to the low reaction temperature, side reactions are sup-

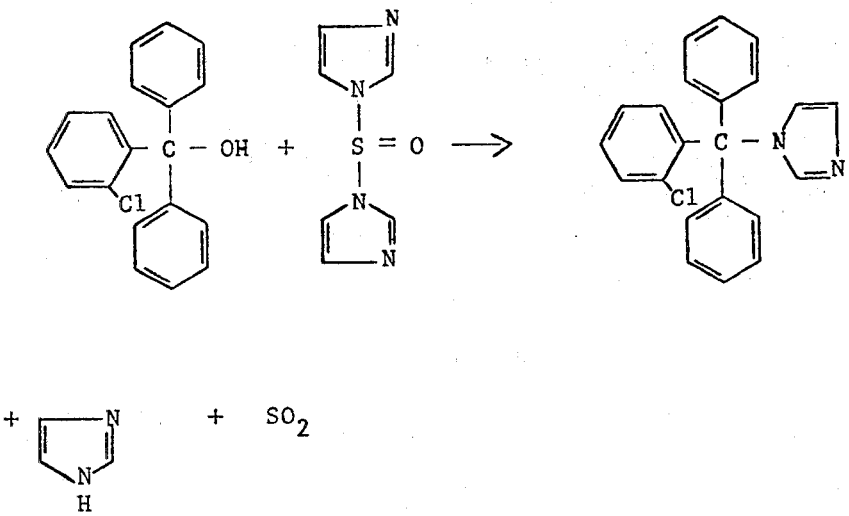

The process according to the invention must be regarded as chemically unusual, since the smooth formation of N-(1,1,1-trisubstituted)-methylazoles and the good yields were surprising and not to be foreseen.

pressed, discolorations of the final product do not occur, the final products are obtained with a high degree of purity, and even reactions with temperature-sensitive substituents can be easily carried out.

The invention is illustrated by the following nonlimitative examples:

EXAMPLE 1

N-(1,1,1Triphenyl)-methyl-1,2,4-Triazole 27.6 g (0.4 mol) of 1,2,4-triazole were suspended in 300 ml of acetonitrile, and 11.9 g (0.1 mol) of thionyl chloride were added dropwise; the precipitated triazole hydrochloride was removed by filtration. The filtrate was mixed with a solution of 25 g (0.1 mol) of tritylcarbinol in 200 ml of acetonitrile and the reaction mixture was heated under reflux until the generation of SO₂ terminated. The solution was cooled to 20° C., stirred into water, and 28.7 g (92% of the theoretical yield) of N-(1,1,1-triphenyl)-methyl-1,2,4-triazole of the formula:

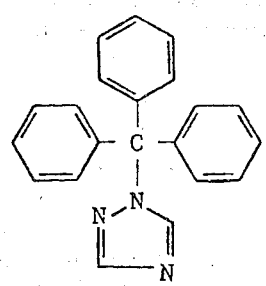

of m.p. 208°–211° C. were obtained.

EXAMPLE 2

N-[1-(2-N'-Methylimidazolyl)-1-2-(2''-Methylphenyl)-1-Phenyl]-methyl-imidazole 27.2 g (0.4 mol) of imidazole were dissolved in 300 ml of acetonitrile and 11.9 g (0.1 mol) of thionyl chloride were added dropwise; the precipitated imidazole hydrochloride was removed by filtration. The filtrate was mixed with a solution of 1-(2'-N-methylimidazolyl)-1-(2''-methylphenyl)-benzyl alcohol in 300 ml of acetonitrile, and the reaction mixture was heated under reflux until the generation of SO₂ terminated. By concentrating the solution to about one-tenth of the original volume, there were obtained 15.2 g (50% of the theoretical yield) of N-[1-(2'-N'-methylimidazolyl)-1-(2''-methylphenyl)-1-phenyl]-methyl-imidazole of the formula:

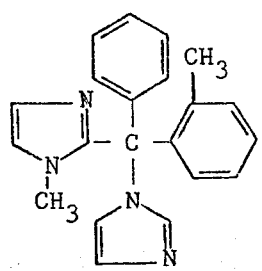

of m.p. 186° C.

EXAMPLE 3

Phenyl-2-isopropylphenyl-2-pyridyl-imldazol-1-yl-methane 15.0 g (0.05 mol) of phenyl-2-isopropyl-phenyl-2-pyridyl-carbinol (m.p. 128° C.) were mixed with a solution of 0.06 mol of thionyl-diimidazole in 100 ml of acetonitrile, and the mixture was heated under reflux for 2 hours. The mixture was subsequently concentrated, the residue was taken up with methylene chloride, shaken several times with water, the organic phase was dried and the methylene chloride solution concentrated. The residue crystallized upon trituration with ether. In this way, there were obtained 14.5 g (82% of the theoretical yield) of phenyl-2-isopropylphenyl-2-pyridylimidazol-1-yl-methane of the formula:

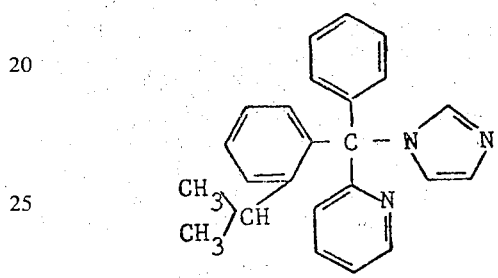

of m.p. 162°–165° C.

EXAMPLE 4

Cyclopropyl-diphenyl-imidazol-1-yl-methane 22.4 g (0.1 mol) of cyclopropyl-diphenyl-carbinol were mixed with a solution of 0.15 mol of freshly prepared thionyl-diimidazole in 200 ml of absolute acetonitrile and the mixture was heated under reflux for 2 hours. The mixture was subsequently concentrated, the residue was taken up with methylene chloride, shaken several times with water, the organic phase was dried over sodium sulphate and the methylene chloride solution was concentrated. The residue was triturated with ether, whereupon it crystallized. In this way, there were obtained 19.4 g (71% of the theoretical yield) of cyclopropyldiphenyl-imidazol-1-yl-methane of the formula:

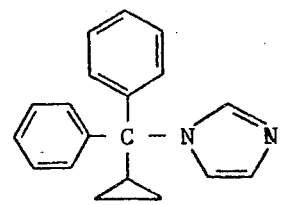

of m.p. 107°–109° C.

EXAMPLE 5

Phenyl-2-nitrophenyl-2-pyridyl-imidazol-1-yl-methane

From 32.5 g (0.48 mol) of imidazole, 14.3 g (0.12 mol) of thionyl chloride in 150 ml of absolute tetrahydrofuran there was prepared, at −5° C., a solution of 0.12 mol of thionyldiimidazole; the precipitated imidazole hydrochloride was filtered off with suction, and the filtrate was mixed with 30.6 g (0.1 mol) of phenyl-3-nitrophenyl-2-pyridyl-carbinol. The resultant solution was heated under reflux for 3–4 hours, concentrated, the residue mixed with water, and the product filtered off with suction. There were obtained 35.1 g (98% of the theoretical yield) of phenyl-3-nitrophenyl-2-pyridylimidazol-1-yl-methane of the formula:

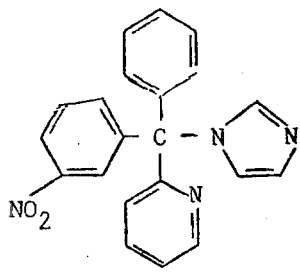

of m.p. 145°–150° C. Recrystallization from acetonitrile yielded 30.8 of pure product of m.p. 166° C.

The following compounds can be obtained in analogous manner:

The following compounds of the formula:

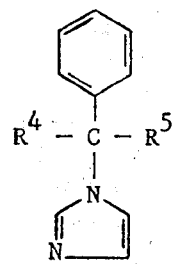

can also be obtained in analogous manner:

| | m.p. °C. |
|---|---|
| 1-(trisphenyl-methyl)-2-methyl-imidazole | 225 |
| 1-(trisphenyl-methyl)-2,4-dimethyl-imidazole | 232 |
| 1-(trisphenyl-methyl)-4,5-diphenyl-imidazole | 228–230 |
| 1-(p-chlorophenyl-diphenyl-methyl)-imidazole | 140 |
| 1-(p-fluorophenyl-diphenyl-methyl)-imidazole | 145 |
| 1-(p-tolyl-diphenyl-methyl)-imidazole | 128 |
| 1-(o-chlorophenyl-diphenyl-methyl)-imidazole | 147–149 |
| 1-(m-chlorophenyl-diphenyl-methyl)-imidazole | 114 |
| 1-(p-bromophenyl-diphenyl-methyl)-imidazole | 152 |
| 1-(o-fluorophenyl-diphenyl-methyl)-imidazole | 185 |
| 1-(m-fluorophenyl-diphenyl-methyl)-imidazole | 174 |
| 1-(p-nitrophenyl-diphenyl-methyl)-imidazole | 160–170 |
| 1-(m-trifluoromethylphenyl-diphenyl-methyl)-imidazole | 156 |
| 1-(p-cyanophenyl-diphenyl-methyl)-imidazole | 164 |
| 1-(o-methoxyphenyl-diphenyl-methyl)-imidazole | 130 |
| 1-(p-methylthiophenyl-diphenyl-methyl)-imidazole | 142 |
| 1-(p-fluorophenyl-diphenyl-methyl)-2-methyl-imidazole | 199 |
| 1-(p-fluorophenyl-p-chlorophenyl-phenyl-methyl)-imidazole | 144 |
| 1-(p-chlorophenyl-m-fluorophenyl-phenyl-methyl)-imidazole | 116 |
| 1-(p-chloro-m-nitrophenyl-diphenyl-methyl)-imidazole | 150 |
| 1-(p-bromophenyl-p-chlorophenyl-phenyl-methyl)-imidazole | 140 |
| 1-(m-cyanophenyl-diphenyl-methyl)-imidazole | 119 |
| 1-(m-nitrophenyl-diphenyl-methyl)-imidazole | 163 |
| 1-(m-aminophenyl-diphenyl-methyl)-imidazole | 187 |
| 1-(p-fluorophenyl-p-dimethylaminophenyl-phenyl-methyl)-imidazole | 129–134 |
| 1-(p-dimethylamino-diphenyl-methyl)-imidazole | 155–162 |
| 1-(p-chlorophenyl-p-nitrophenyl-phenyl-methyl)-imidazole | 139–140 |
| 1-(trisphenyl-methyl)-1,2,4-triazole | 219 |
| 1-(o-chlorophenyl-diphenyl-methyl)-1,2,4-triazole | 154 |
| 1-[4'-methylthiophenyl-5''-(3''-methyl)-isoxazolyl-phenyl-methyl]-1,2,4-triazole | 94–97 |
| 1-[4'-methylthiophenyl-3''-(5''-methyl)-isoxazolyl-phenyl-methyl]-1,2,4-triazole | 116–117 |
| 1-[4'-chlorophenyl-3''-(5''-methyl)-isoxazolyl-phenyl-methyl]-1,2,4-triazole | 104–106 |
| 1-[4'-fluorophenyl-5''-(3''-methyl)-isoxazolyl-phenyl-methyl]-1,2,4-triazole | 127–128 |
| 1-[4'-tert.butylphenyl-2''-(1''-methyl)-imidazolyl-phenyl-methyl]-imidazole | 130 |
| 1-[3'-methylphenyl-2''-(1''-methyl)-imidazolyl-phenyl-methyl]-imidazole | 120 |
| 1-(m-tolyl-diphenyl-methyl)-imidazole | oil |
| 1-(o-tolyl-diphenyl-methyl)-imidazole | 128–129 |
| 1-(4-carbomethoxyphenyl-diphenyl-methyl)-imidazole | 164 |
| 1-(2-ethylphenyl-diphenyl-methyl)-imidazole | 137–140 |
| 1-(2-isopropylphenyl-diphenyl-methyl)-imidazole | oil |
| 1-(2,6-dichlorophenyl-diphenyl-methyl)-imidazole | 168–169 |
| 1-(3-carbomethoxyphenyl-diphenyl-methyl)-imidazole | 90 (hydrochloride) |
| 1-(3-carboxyphenyl-diphenyl-methyl)-imidazole | |
| 1-(4-carboxyphenyl-diphenyl-methyl)-imidazole | 87–96 |
| 1-(bis-4-methoxyphenyl-carbomethoxy-methyl)-imidazole | 130–131 |
| 1-(diphenyl-carbomethoxy-methyl)-imidazole | 35 |
| 3-(3-phenyl-4-carbethoxy)pent-3-yl-imidazole | oil |
| 1-(2'-thienyl-diphenyl-methyl)-imidazole | 178–179 |
| 1-[diphenyl-3'-(5'-methyl)-isoxazolyl-methyl]-imidazole | 149–150 |
| 1-[diphenyl-2'-(1'-methyl)-imidazolyl-methyl]-imidazole | 200 |

| R⁴ | R⁵ | | m.p.°C. |
|---|---|---|---|
| phenyl | 2-pyridyl | | 222–224 |
| phenyl | 3-pyridyl | | 208–210 |
| phenyl | 4-pyridyl | | 217–218 |
| 4-fluorophenyl | 4-pyridyl | | 145–146 |
| 4-chlorophenyl | 4-pyridyl | | 157–158 |
| 4-bromophenyl | 4-pyridyl | | 136–139 |
| 4-fluorophenyl | 2-pyridyl | | 162–164 |
| 2-chlorophenyl | 2-pyridyl | | 145–149 |
| 1-methylimidazol-2-yl | 3-methylisoxazol-5-yl | | 100 |
| 1-methylimidazol-2-yl | 2-methylphenyl | | 186 |
| 4-cyanophenyl | 4-fluorophenyl | | 116 |
| 1-naphthyl | 4-chlorophenyl | | 110 |
| 1-naphthyl | phenyl | | 170 |
| 1-naphthyl | 2-fluorophenyl | | 100 |
| 4-methoxyphenyl | phenyl | | 154 |
| 2-hydroxyphenyl | phenyl | | 240 |
| 4-hydroxyphenyl | phenyl | | 179 |
| 4-methylsulphonyl | phenyl | | 220 |
| pent-3-yl | ethoxycarbonylmethyl | | oil |
| isopropyl | ethoxycarbonylmethyl | | oil |
| isopropyl | ethoxycarbonyl | | oil |
| adamat-1-yl | phenyl | | 188–191 |
| fur-2-yl | phenyl | | 120 |
| 4-chlorophenyl | 2-pyridyl | | 138–140 |
| 4-bromophenyl | 2-pyridyl | | 130 |
| 3-trifluoro-methyl-phenyl | 2-pyridyl | | 94–96 |
| 4-methylmercaptophenyl | 2-pyridyl | | 150–152 |
| 2-chlorophenyl | 3-pyridyl | | 116–118 |
| 2-fluorophenyl | 3-pyridyl | | 172–173 |
| 2-fluorophenyl | 2-pyridyl | | 193–194 |
| 2-chlorophenyl | 4-pyridyl | | 72–75 |
| 3-chlorophenyl | 4-pyridyl | | 130 |
| 3-trifluoromethyl-phenyl | 4-pyridyl | | 110–112 |
| 4-methylmercaptophenyl | 4-pyridyl | | 161 |
| 2-fluorophenyl | 4-pyridyl | | 197 |
| 3-nitrophenyl | 2-pyridyl | | 166 |
| 4-nitrophenyl | 2-pyridyl | | 125 |
| 4-nitrophenyl | 2-pyridyl | | 123–125 |
| 4-phenoxyphenyl | 2-pyridyl | | 137–139 |
| 4-methylphenyl | 2-pyridyl | | 144–145 |
| 2-methylphenyl | 2-pyridyl | | 162–165 |
| 2-methoxyphenyl | 2-pyridyl | | 118–120 |
| 3-methylphenyl | 2-pyridyl | | 108–110 |
| 3-isopropylphenyl | 2-pyridyl | | 162 |
| 2-ethoxyphenyl | 2-pyridyl | | 123–125 |
| 4-phenoxyphenyl | 4-pyridyl | | 163–167 |
| 4-methylphenyl | 4-pyridyl | | 139–141 |
| 2-methoxyphenyl | 4-pyridyl | | 125 |
| 3-methylphenyl | 4-pyridyl | | 92–96 |
| 2-ethylphenyl | 4-pyridyl | | 159–161 |
| 2-isopropylphenyl | 4-pyridyl | | 136 |
| phenyl | methyl | hydrochloride | 194 |
| p-chlorophenyl | t-butyl | | 137 |
| p-fluorophenyl | t-butyl | | 117 |
| m-chlorophenyl | t-butyl | | 90 |
| phenyl | t-butyl | hydrochloride | 170 |
| p-chlorophenyl | t-butyl | hydrochloride | 181 |
| p-methylmercaptophenyl | t-butyl | hydrochloride | 140 |
| p-tolyl | t-butyl | | 139 |
| p-phenoxyphenyl | t-butyl | oilₙ 24 | 1,5683 |
| m-tolyl | t-butyl | | 87 | and
1-[diphenyl-pyridyl-(4)]-1,2-dimethyl-imidazole  m.p. 178°C.
1-[4′-chlorophenyl-4′-fluorophenyl-2′-pyridyl]-methyl-imidazole  m.p. 138°C.

Furthermore, 1-substituted imidazoles of the formula:

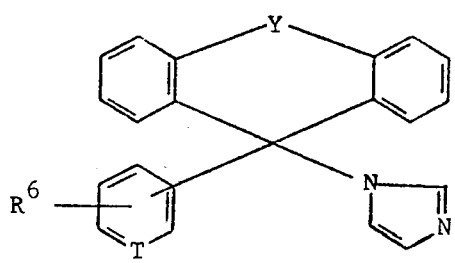

can be obtained according to the process of the invention:

| R⁶ | T | Y | m.p.°C. |
|---|---|---|---|
| H | CH | — | 197–199 |
| 4—F | CH | — | 156–159 |
| 4—Cl | CH | — | 176–180 |
| 4—Br | CH | — | 181–184 |
| 4—SCH₃ | CH | — | 164–165 |
| 3—CF₃ | CH | — | 134–138 |
| 3—Cl | CH | — | 116–119 |
| 2—Cl | CH | — | 156–158 |
| H | CH | —(CH₂)₂— | 186–187 |
| 4—Cl | CH | —(CH₂)₂— | 216–218 |
| 4—F | CH | —(CH₂)₂— | 178–180 |
| H | CH | —O— | 160–162 |
| H | CH | —S— | 179–181 |
| H | CH | CH=CH | 208–211 |
| 4—F | CH | CH=CH | 230–231 |
| 4—Cl | CH | CH=CH | 231 |
| 2—Cl | CH | CH=CH | 210–215 |
| 3—CF₃ | CH | CH=CH | 118–120 |
| 3—Cl | CH | CH=CH | 119–201 |
| 3—CF₃ | CH | CH₂—CH₂ | 115–118 |
| 4—SCH₃ | CH | CH₂—CH₂ | 180–183 |
| 3—CF₃ | CH | CH₂—CH₂ | 115–118 |
| H | 3—N | — | 80–85 |
| H | 3—N | CH₂—CH₂ | 147–149 |
| 2—CH₃ | CH | — | 161–169 |

What is claimed is:

1. A process for the preparation of an N-(1,1,1-trisubstituted)-methylazole of the formula:

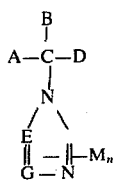

in which
- A is straight or branched chain alkyl of 1 to 8 carbon atoms, straight or branched chain alkenyl of up to 8 carbon atoms, cyclopropyl, cyclopentyl, cyclohexyl, bicyclo-heptyl or adamantyl, or
- A is phenyl, naphthyl, pyridyl or imidazole each of which is unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, monoalkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl;
- B is straight or branched chain alkyl of 1 to 8 carbon atoms, straight or branched chain alkenyl of up to 8 carbon atoms, cyclopropyl, cyclopentyl, cyclohexyl, bicyclo-heptyl or adamantyl, or
- B is phenyl or naphthyl each of which is unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, $NO_2$, $CN$, $CF_3$, halogen or hydroxyl, or
- B is a 5- or 6-membered ring system of the formula:

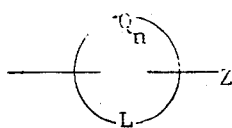

wherein
- L is oxygen, sulphur, >N-alkyl of 1 to 4 carbon atoms, >N-phenyl or CH;
- Q is nitrogen or CH;
- Z is hydrogen, alkyl of 1 to 4 carbon atoms, halogen or phenyl, and
- n is 1 or 2; or
- A and B together with the central carbon atom are linked to form an aliphatic ring with 3–7 carbon atoms; or
- A and B are linked to one another so that together with the central carbon atom to which they are linked they form a ring system of the formula:

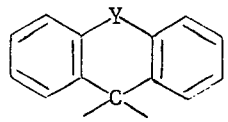

wherein
- Y is a direct bond, sulphur oxygen, alkylene of 1 to 3 carbon atoms or CH=CH;
- D is straight or branched chain alkyl of 1 to 8 carbon atoms, straight or branched chain alkenyl of up to 8 carbon atoms, cyclopropyl, cyclopentyl, cyclohexyl, bicyclo-heptyl or adamantyl, or
- D is phenyl or naphthyl each of which is unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl; or
- D is alkoxy-carbonyl of 1 to 4 carbon atoms in the alkoxy moiety, alkoxy-carbonyl-alkyl of 1 to 4 carbon atoms in each of the alkoxy and alkyl moieties, or
- D is a 5- or 6-membered ring system of the formula:

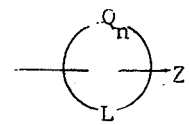

wherein
Q, L, Z and n have the same meaning as above; and
in which

E is nitrogen, —CH or —C—$R^1$; and

G is nitrogen, —CH or —C—$R^2$;

wherein
$R^1$ and $R^2$ together with the carbon atoms of E and G form a fused benzene ring;
M is hydrogen, alkyl of 1 to 4 carbon atoms, phenyl, naphthyl, or alkoxy-carbonyl of 1 to 4 carbon atoms in the alkyl moiety; and
m is 1, 2 or 3, which comprises reacting a thionyl-azolide of the formula:

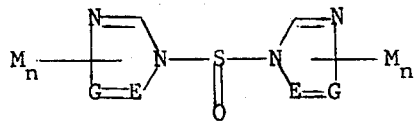

in which
E, G, M and m have the same meaning as above, with a carbinol of the formula:

in which

A, B and D have the same meaning as above, in a dry organic solvent inert to the reaction at a temperature in the range of −20° C to +150° C.

2. A process as claimed in claim 1 wherein when Y is alkylene it is (CH$_2$)$_2$ and wherein M is methyl, methoxycarbonyl ethoxycarbonyl, or phenyl and $m$ is 1 or 2.

3. A process as claimed in claim 1, wherein

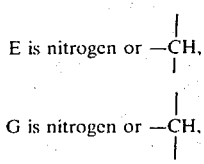

M is hydrogen, methyl or phenyl and $m$ is 1 or 2.

4. A process as claimed in claim 1 wherein

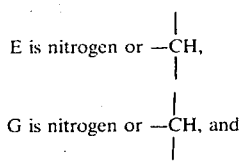

M is hydrogen.

5. A process as claimed in claim 4 wherein A, B and D are each phenyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl.

6. A process as claimed in claim 4 wherein two of A, B and D are phenyl and the third is imidazolyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl.

7. A process as claimed in claim 4 wherein two of A, B and D are phenyl and the third is pyridyl, unsubstituted of substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl.

8. A process as claimed in claim 4 wherein two of A, B and D are phenyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl and the third is cyclopropyl.

9. A process as claimed in claim 4 wherein A is phenyl, one of B and D is isoxazolyl and the other is phenyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyo, halogen or hydroxyl.

10. A process as claimed in claim 4 wherein A and B are phenyl, unsubstituted or substituted by alkyl of 1 to 4 carbon atoms, alkoxy of 1 to 4 carbon atoms alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl and D is alkoxycarbonyl of 1 to 4 carbon atoms in the alkoxy moiety.

11. A process as claimed in claim 4 wherein one of A and B is phenyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl, the other is alkyl of 1 to 5 carbon atoms and D is carbalkoxy of 1 to 4 carbon atoms, unsubstituted or substituted by alkyl of 1 to 4 carbon atoms.

12. A process as claimed in claim 4 wherein A is phenyl, one of B and D is thienyl and the other is phenyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl.

13. A process as claimed in claim 4 wherein A is phenyl, one of B and D is isoxazolyl, and the other is imidazolyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl.

14. A process as claimed in claim 4 wherein one of A, B and D is naphthyl and the other two are phenyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl.

15. A process as claimed in claim 4 wherein A and B are phenyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, monoalkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl and D is alkylsulphonyl of 1 to 4 carbon atoms.

16. A process as claimed in claim 4 wherein two of A, B and D are phenyl and the third is adamantyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl.

17. A process as claimed in claim 4 wherein two of A, B and D are phenyl and the third is furyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboxyl, carbalkoxy of 1 to 4 carbon atoms, nitro, cyano, trifluoromethyl, halogen or hydroxyl.

18. A process as claimed in claim 4 wherein two of A, B and D are phenyl, unsubstituted or substituted by alkyl of 1 to 4 carbon atoms, alkoxy of 1 to 4 carbon atoms, alkylmercapto of 1 to 4 carbon atoms, phenoxy, alkylsulphonyl of 1 to 4 carbon atoms, amino, mono-alkylamino of 1 to 4 carbon atoms, dialkylamino of 1 to 4 carbon atoms in each alkyl moiety, carboyxl, carbalkoxy of 1 to 4 carbon atoms, nitro, cyano, trifluoromethyl, halogen or hydroxyl and the third is alkyl of 1 to 5 carbon atoms.

19. A process as claimed in claim 4 wherein E and G are

M is hydrogen, D is

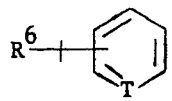

wherein $R^6$ is hydrogen, fluorine, chlorine, bromine, methyl, mercaptomethyl or trifluoromethyl and T is CH or N and A and B together with the central carbon atom are linked to form a ring system of the formula

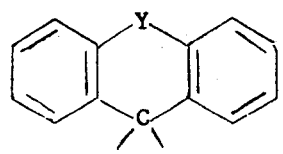

wherein Y is a direct bond, $-(CH_2)_2-$, oxygen, sulphur or CH = CH.

20. A process as claimed in claim 4, wherein A, B and D are selected from the group consisting of phenyl and naphthyl.

21. A process as claimed in claim 4, wherein A, B and D are phenyl or naphthyl, unsubstituted or substituted by alkyl of 1 to 4 carbon atoms, alkoxy of 1 to 4 carbon atoms or alkylmercapto of 1 to 4 carbon atoms.

22. A process as claimed in claim 21, wherein the substituents are methoxy, ethoxy or methylmercapto.

23. A process as claimed in claim 4, wherein A, B and D are phenyl or naphthyl, unsubstituted or substituted by phenoxy, alkylsulphonyl of 1 to 4 carbon atoms, amino, mono- or dialkylamino of 1 to 4 carbon atoms in each alkyl moiety, carboxyl or carbalkoxy of 1 to 4 carbon atoms in the alkoxy moiety, hydroxyl, nitro, cyano, trifluoromethyl, fluorine, chlorine or bromine.

24. A process as claimed in claim 4, wherein A is pyridyl.

25. A process as claimed in claim 4, wherein B, D or both is alkyl of 1–5 carbon atoms.

26. A process as claimed in claim 4, wherein A, D or both is alkyl of 1 to 5 carbon atoms.

27. A process as claimed in claim 4, wherein B, D or both are heteroaromatic rings of the formula:

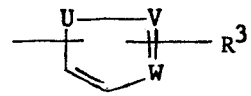

wherein U is oxygen or sulphur, NH or N-alkyl of 1–4 carbon atoms, V and W are identical or different and each is nitrogen or CH and $R^3$ is hydrogen or alkyl of 1 to 4 carbon atoms.

28. A process as claimed in claim 27, wherein B, D or both are thienyl, isoxazolyl, imidazolyl or furyl, unsubstituted or substituted by alkyl of 1 to 4 carbon atoms.

29. A process as claimed in claim 4, wherein the thionyl-azolide is thionyl-bis-imidazole.

30. A process as claimed in claim 4, wherein the thionyl-azolide is thionyl-bis-(1,2,4-triazole).

31. A process as claimed in claim 4, wherein the carbinol is a trityl-carbinol.

32. A process as claimed in claim 4, wherein the carbinol is a heteroaryl-diphenyl-carbinol.

33. A process as claimed in claim 4, wherein the carbinol is an alkyl-diphenyl-carbinol.

34. A process as claimed in claim 4, wherein the carbinol is o-chlorophenyl-diphenyl-carbinol.

35. A process as claimed in claim 4, wherein the carbinol is methoxycarbonyl-diphenylcarbinol.

36. A process as claimed in claim 4, wherein the carbinol is 3-nitrophenyl-phenyl-2-pyridyl-carbinol.

37. A process as claimed in claim 4, wherein the carbinol is dicyclohexyl-phenyl-carbinol.

38. A process as claimed in claim 4, wherein the carbinol is 5-(3,4-dichloro-isothiazolyl)-4-fluorophenyl-phenylcarbinol.

39. A process as claimed in claim 4, wherein the carbinol is diphenyl-m-trifluoro-methyl-phenyl-carbinol.

40. A process as claimed in claim 4, wherein the carbinol is diphenyl-o-tolyl-carbinol.

41. A process as claimed in claim 4, wherein o-chlorophenyl-diphenyl-carbinol is reacted with thionyl-imidazole.

42. A process as claimed in claim 4, wherein methoxycarbonyl-diphenyl-carbinol is reacted with thionyl-imidazole.

43. A process as claimed in claim 4, wherein 3-nitrophenyl-phenyl-2-pyridyl-carbinol is reacted with thionyl-imidazole.

44. A process as claimed in claim 4, wherein dicyclohexyl-phenyl-carbinol is reacted with thionyl-imidazole.

45. A process as claimed in claim 4, wherein 5-(3,4-dichloro-isothiazolyl)-4-fluorophenyl-phenyl-carbinol is reacted with thionyl-imidazole.

46. A process as claimed in claim 4, wherein diphenyl-m-trifluoromethyl-phenyl-carbinol is reacted with thionyl-imidazole.

47. A process as claimed in claim 4, wherein diphenyl-o-tolyl-carbinol is reacted with thionyl-imidazole.

48. A process as claimed in claim 4, wherein the solvent used is an aliphatic or aromatic hydrocarbon boiling in the range from 60° to 120° C.

49. A process as claimed in claim 48, wherein the solvent is selected from petroleum ether, benzene or toluene.

50. A process as claimed in claim 4, wherein the solvent is acetonitrile.

51. A process as claimed in claim 4, wherein the starting materials for the reaction are used in a molar ratio of 1:1.

52. A process as claimed in claim 4, wherein the reaction is carried out at a temperature in the range of 0° to 80° C.

53. A process as claimed in claim 52, wherein the reaction is carried out at a temperature in the range of 0° to 50° C.

* * * * *